March 11, 1952  C. V. EVERETT  2,588,711
BLOWER ELEVATOR
Filed Oct. 16, 1948  3 Sheets-Sheet 1
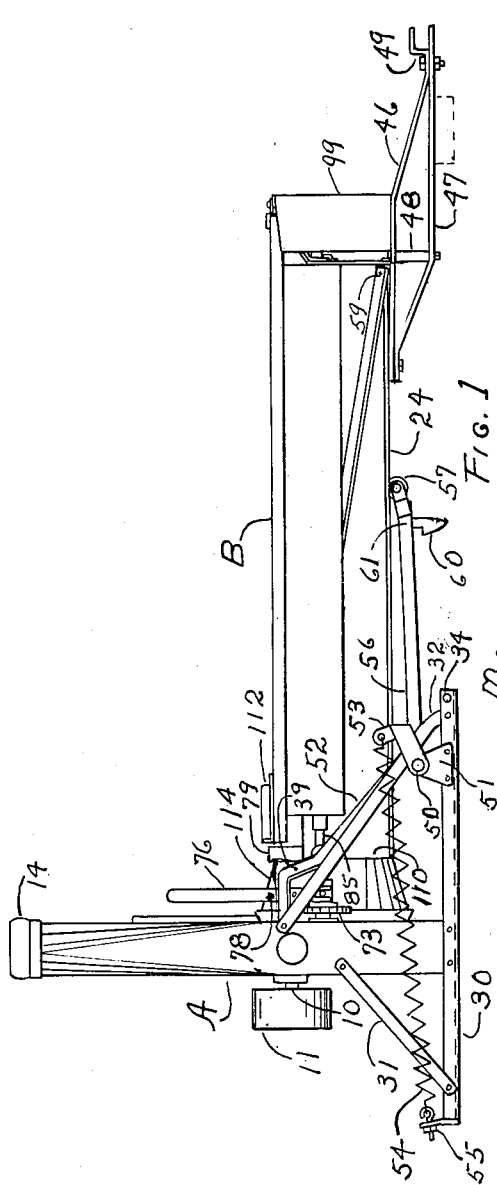
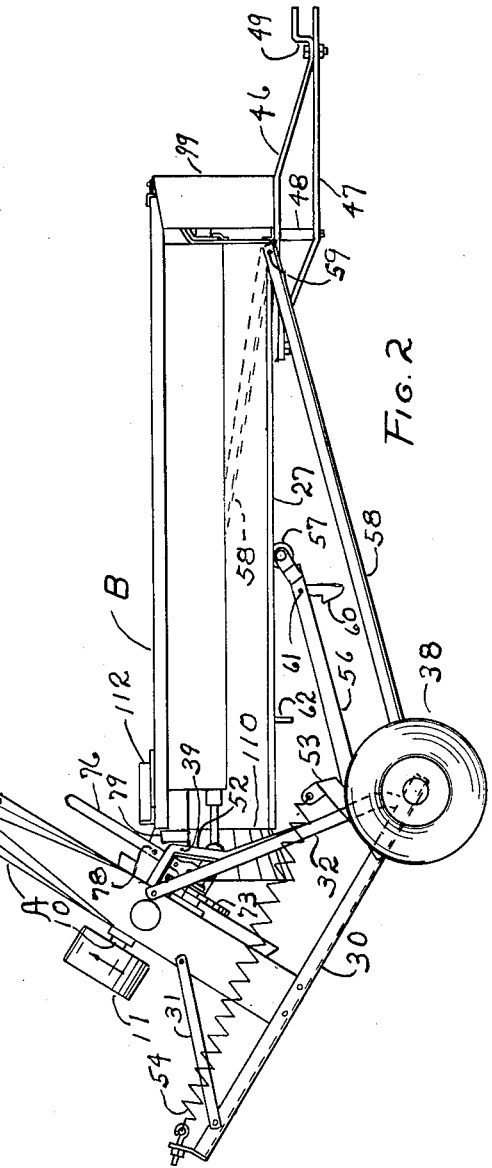
INVENTOR.
CHARLES V. EVERETT
BY
ATTORNEY March 11, 1952 C. V. EVERETT 2,588,711
BLOWER ELEVATOR
Filed Oct. 16, 1948 3 Sheets-Sheet 2
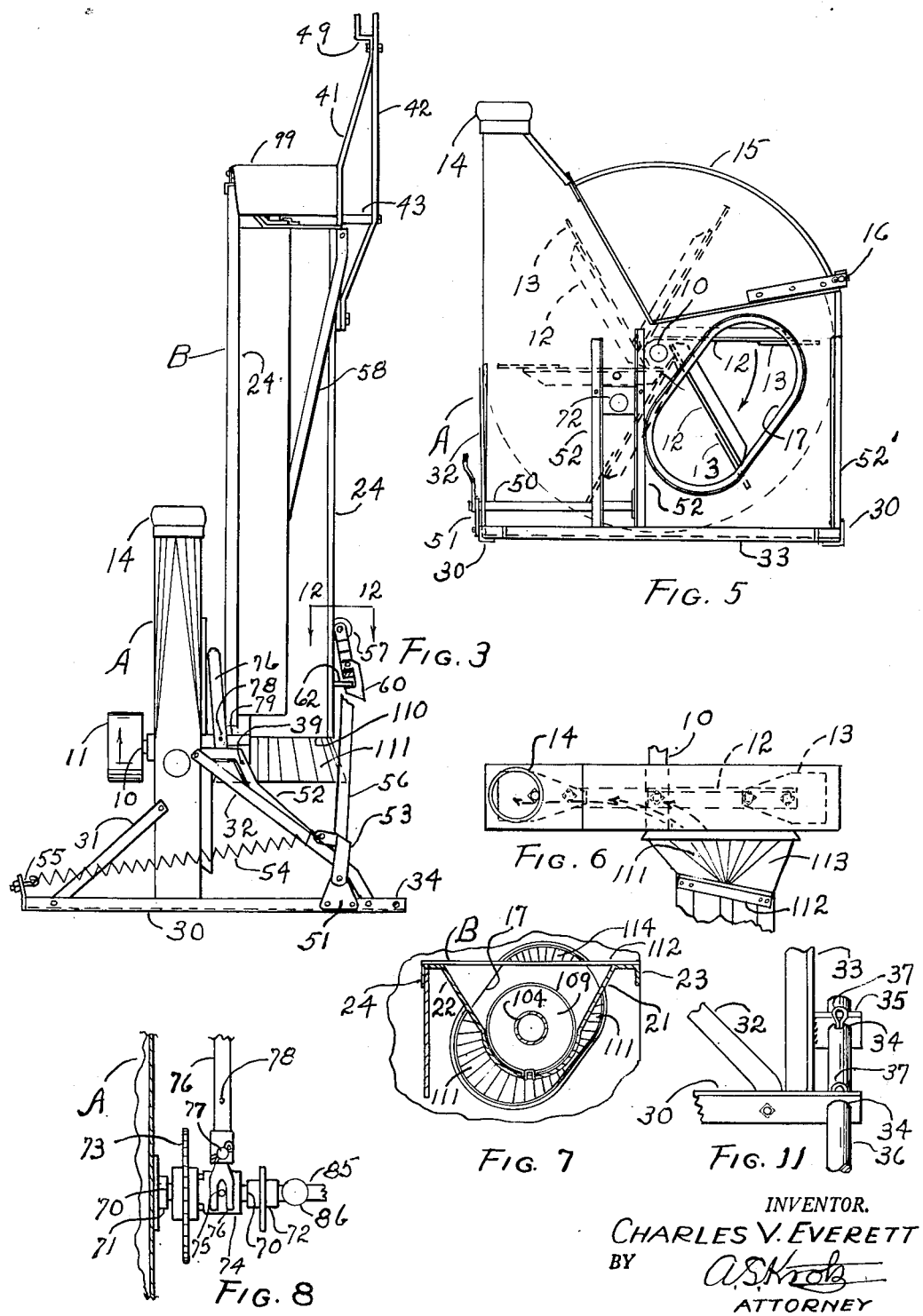
INVENTOR.
CHARLES V. EVERETT
BY
A.S.Krob
ATTORNEY March 11, 1952
C. V. EVERETT
2,588,711
BLOWER ELEVATOR
Filed Oct. 16, 1948
3 Sheets-Sheet 3
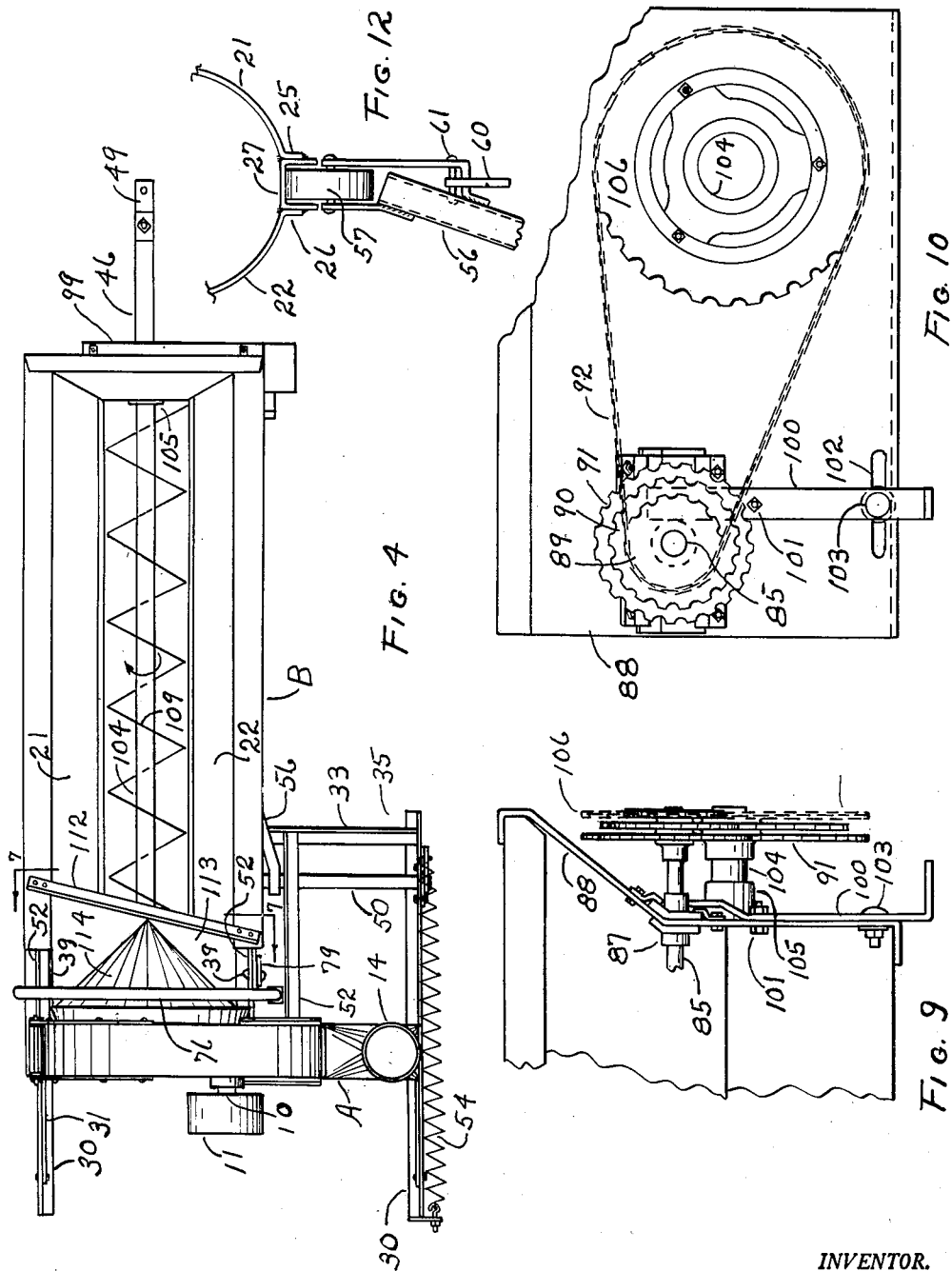
INVENTOR.
CHARLES V. EVERETT
BY
ATTORNEY Patented Mar. 11, 1952

2,588,711

UNITED STATES PATENT OFFICE 2,588,711

BLOWER ELEVATOR

Charles V. Everett, Racine, Wis., assignor to Massey-Harris Company, Racine, Wis., a company of Maryland Application October 16, 1948, Serial No. 54,959

2 Claims. (Cl. 302—37)

The present invention relates to a convenient means for receiving chopped hay or the like and elevating it blower like into silos or storage bins.

Recently machines have been devised for cutting grass or hay crops and chopping and loading it into trailers. Generally the trailers are adapted to be hauled by tractors and the material is quite heavy. In order to make it convenient for conveying the chopped hay into the silo, the trailer box is generally provided with a conveyor, manure spreader fashion, and a power unit is provided for quick attachment to this conveyor so the chopped hay can be power delivered from the rear end of the box into the blower trough.

It has been the custom to provide blower elevators with a receiving trough, the loaded trailer is backed to the trough so the chopped hay will fall into the trough as the trailer conveyor is operated. This is a rather inconvenient way to get the trailer in position for unloading, especially when a tractor pulled trailer is used.

An important object of the present invention is to provide a blower trough which is hinged to the blower and spring balance it on its hinges so the trough can be easily raised out of the way and the trailer moved past the trough far enough so the trough can then be lowered to its operating position after which it is a comparatively simple matter to back the trailer slightly so its rear end is over the trough.

In the present invention I provide a novel auger feed for the trough and operate it from the blower. Thus when the blower is in motion the trailer conveyor may be started, and the chopped material fed into the trough and by the trough auger into the blower.

It will be understood that chopped green hay for example, is very heavy, sticky and hard to handle. I have therefore provided my blower with novel means for receiving the material from the auger trough.

Another novel feature of my invention is the means I provide for convenient transportation wherein carrying wheels may be conveniently attached to the forward corners of the blower frame and the rear end of the blower frame raised and locked to the trough structure thereby providing suitable means for transportation.

To these and other useful ends my invention consists of parts, combinations of parts or their equivalents and mode of operation as hereinafter described and claimed and shown in the accompanying drawings in which:

Fig. 1 is a side elevational view of my improved blower elevator with the trough in an operating position.

Fig. 2 is a view similar to Figure 1 except with the transporting wheels attached and the blower structure raised on its hinged connection to the trough and locked into position.

Fig. 3 is a side elevational view showing the auger trough in an elevated position.

Fig. 4 is a top view of my device as shown in Figure 1.

Fig. 5 is an inlet side elevational view of the blower unit with the auger trough detached.

Fig. 6 is a top view of a fraction of the blower unit showing a fraction of the auger trough attached to the blower and in an operating position.

Fig. 7 is an inlet side view of a fraction of the blower unit, the auger trough being sectioned on line 7—7 of Figure 4.

Fig. 8 is a fractional detail view somewhat enlarged, illustrating a fraction of the blower and trough structure and the auger driving clutch mechanism.

Figs. 9 and 10 are fractional side and end views of the free end of the trough structure illustrating the means for driving the auger and adjusting the chain.

Fig. 11 is a fractional perspective view of the front right corner of the blower frame illustrating a fraction of the carrying wheel axle.

Fig. 12 is a sectional view taken on line 12—12 of Figure 3.

As thus illustrated the blower and its frame structure in its entirety is designated by reference character A. The auger trough in its entirety is designated by reference character B.

Member A has the shape of a conventional blower having a blower shaft 10 and a driving pulley 11, the shaft having a hub (not shown) secured thereto and between the side walls of member A. The hub has secured thereto preferably six arms 12 on the ends of which are mounted blades 13. The left upper corner of member A has a conventional shape with an outlet 14. A large portion of the upper right corner of member A is cut away and provided with a lid 15 hinged to the blower frame as at 16 so this member 15 may be swung out of the way for purposes of inspection, etc. Suitable means (not shown) are provided for locking member 15 in its operating position.

As illustrated in Figure 5, blades 13 and their supporting arms turn in the direction indicated by a curvilinear arrow. This figure illustrates my novel inlet opening 17 to the fan. It will be noted that this opening is oblong and positioned at an angle as illustrated in Figures 5 and 7.

Member B in its various positions relative to member A is clearly illustrated in Figures 1, 2 and 3. The lower half of trough B as clearly illustrated in Figure 7 is circular in shape. Side members 21 and 22 diverge upwardly and outwardly, their upper edges having flanges 23 and 24. Thus as illustrated in Figure 4 the opening into the trough is very wide. Members 21 and 22 (see Figure 12) at their bottoms are provided with flanges 25 and 26, the flanges being welded or otherwise secured to the depending flanges of a channel 27, the channel being positioned on its upper side to substantially preserve the contour of the bottom half of the trough. Thus the trough will be considerably strengthened and answer for another purpose as will hereinafter appear.

Member A is supported on a suitable frame comprising side members 30—30 which are preferably L shaped and being secured to the lower corners of member A (see Figures 1, 3 and 4) and having suitable braces 31—31 and 32 and 32' (32' not shown). Members 30 at their forward ends are connected together by brace member 33 thus forming a substantial support for the device.

Member 33 (see Figures 4 and 11) is secured to members 30 a short distance from the front ends of these members providing room for openings 34. A short distance from members 30, brackets 35—35 are secured to member 33. This bracket also has openings 34. Openings 34 are provided for the reception of axles 36—36 which after being inserted are held in position by means of cotter pins 37—37. Upon the outer ends of axles 36 I preferably rotatably mount rubber tired carrying wheels 38—38. Thus clearly the carrying wheels can be easily and quickly detached from or attached to the frame.

Figure 1 illustrates the blower frame as resting on the ground and the blower and trough in an operating position. When it is desired to transport the device, wheels 38 are mounted on the frame after the front end of the frame is lifted for this purpose, and then the rear end of the frame is lifted to the position shown in Figure 2 and secured in this position to member B as will hereinafter appear.

It will be noted that member B is hinged to member A as at 39—39 as will hereinafter appear, so member B can be positioned as illustrated in Figures 1, 2 or 3, Figure 1 being the operating position, Figure 2 the transporting position and Figure 3 the position suitable for storage and for pulling a trailer loaded with shopped hay past member B after which member B is moved to the position shown in Figures 1 and 4, and then the trailer may be backed slightly to the unloading position and the chopped hay delivered into trough B either by the automatic means as already recited or otherwise.

When the device is to be transported, means for hitching to a tractor are provided as follows: Bars 46 and 47 are provided as shown in Figures 1, 2, 3 and 4 and secured to channel 27 with a stiffening brace 48 therebetween. Member 46 is shaped at its front end as at 49 and provided with means for convenient attachment to the draw bar of a tractor.

Thus it will be seen that member 27 has a number of purposes namely whereby the sheet metal of the trough may be formed in two parts and secured to the flanges of member 27 in order to complete a trough having considerable strength and provide a suitable fastening for the hitch member. Member 27 further acts as a suitable means by which the trough may be easily raised or lowered as will hereinafter appear.

A shaft 50 is rotatably mounted at its outer end on a bracket 51 and to another bracket secured to the inside brace 52 (see Figure 5) which extends from member 33 to member A and in about the same position as member 32. This brace also acts as a support for pivots 39. Another brace 52' is positioned on the other side of the trough and answers for the other hinge or pivot 39.

On the outer end of shaft 50 I mount a lever 53 to which a spring 54 is attached as illustrated, the rear end of this spring being anchored to member 30 as at 55. On the inner end of shaft 50 I mount an arm 56 on the front end of which I rotatably mount a roller 57 which is adapted to lie in channel 27 as illustrated in Figure 12. Spring 54 and the position of its fastening to lever 53 is adapted to substantially support member B in any one of its positions shown in the figures whereby the attendant can easily manipulate member B as already outlined.

When it is desired to transport the machine as illustrated in Figure 2, braces 58 which are preferably pivotally attached to member 46 as at 59 are moved downwardly at their rear ends and attached to transverse bar 33 for holding member A in the position shown in Figure 2 otherwise brace 58 at its rear end is detachably secured to member B. Thus in either event hitch bars 46 and 47 are substantially secured to member B and to the frame of member A when transporting as shown in Figure 2.

As shown in Figure 1, when member B is in an operating position its front end will rest on member 47 which may either lie on the ground surface or on a block provided for the purpose. At this time spring 54 will not necessarily be strong enough to overcome the weight of the front end of member B.

When member B is in the position shown in Figure 3 it is necessary to provide means, easily detachable, for holding it in this position. For this purpose I provide a latch 60 which is hinged to member 56 as at 61. I also secure a bracket 62 to member 27 which is positioned and shaped so latch 60 will engage member 62 by gravity as illustrated, thus to firmly fix member B in its raised position.

I will now describe the operating parts of member B and means for disengaging the driving means of these parts when member B is in its raised position.

A shaft 70 is rotatably mounted on member A by means of a bearing 71 and to a bracket secured to members 52 as at 72. A sprocket 73 is rotatably mounted on shaft 70 and is chain driven from blower shaft 10 by means of a suitable sprocket and chain (not shown). A collar 74 is spline mounted on shaft 70. The adjacent ends of the hub of sprocket 73 and collar 74 are shaped whereby when collar 74 is moved to the left, shaft 70 will be driven by sprocket 73 and when moved to the right, shaft 70 will be disengaged from the sprocket. Collar 74 is provided with pins 75 on opposite sides which are adapted to be engaged by a forked lever 76 suitably pivoted as at 77 to braces 52. Lever 76 is U-shaped with its right hand end pivoted to brace 52' in any suitable manner. It is desirable to throw the clutch members out of engagement when member B is moved to the position shown in Figure 3. For this purpose the near arm of member 76 is provided with a pin 78 (see Figure 3).

A throwout bracket 79 is secured to the near side of member B having a cammed surface which engages pin 78 when member B is moved to the position shown in Figures 3 and 8. Clearly member 76 is in a convenient position whereby shaft 70 can be conveniently engaged and disengaged manually by moving lever 76.

A shaft 85 (see Figures 8 and 9) is connected to shaft 70 by means of a universal joint 86. The other end of this shaft is rotatably mounted in a bearing 87 which is slidably mounted as illustrated in Figures 9 and 10 on the outer end enclosure 88 of member B. The outer end of shaft 85 is preferably provided with three chain sprockets 89, 90 and 91 whereby the auger of member B may be driven three different speeds by means of a chain 92. Bearing 87 is slidably mounted on member 88 whereby shaft 85 may be positioned for accommodating the chain when on either one of the three sprockets on shaft 85 as follows:

A depending lever 100 is pivoted to member 88 as at 101. The upper end of lever 100 lies on the right side of bearing 87. Member 88 is provided with a slot 102 and a bolt 103 having a suitable washer which is adapted to bind the lower end of member 100 to member 88. Thus it will be seen that by loosening bolt 103, bearing 87 may move to the right and after the chain has been suitably positioned the lower end of lever 100 can be pushed to the right until the proper tautness of chain 92 is secured and then locked in this position by means of the bolt. In Figures 1, 2 and 3 I illustrate a cover or shield 99 which is adapted to surround the sprockets, chain, etc. to prevent accidental contact and protect the parts from falling hay and dirt.

I will now describe my auger feed for member B. A shaft or tube 104 is rotatably mounted on member 88 by means of a bearing 105. This bearing as will hereinafter appear is mounted for a slight universal movement permitting a limited movement of the free end of shaft 104. The protruding end of shaft 104 is provided with three relatively large sprockets 106, 107 and 108, two not shown. The largest sprocket 106, being on the outer side; thus the chain may be caused to engage any two of the sprockets which are in alignment and without much difference in the distance between shaft 85 and 104. Thus shaft 104 may be turned at three different speeds relative to the speed of the blower shaft 10. Shaft 104 is preferably quite large in diameter and having mounted thereon and within the lower curved portion of the trough an auger feed 109 which is turned in the direction indicated by curvilinear arrows as illustrated in Figure 4. Thus the lower side of the auger 109 turns in the same direction as fan blades 13 and the chopped hay will therefore be moved into the blower inlet 17, generally in the direction as illustrated by dotted arrows in Figure 6. Thus there will not be a sudden impact of the fan blades against material which is not already traveling in the same direction as the blades.

In order to accommodate the trough to the oblong opening 17, the straight portion of the trough is terminated as at 110 (see Figures 3 and 6) and from this point toward the fan housing the trough is flared outwardly as at 111.

I mount on flanges 23 and 24 a generally transverse bar 112. From this bar toward the housing, a plate 113 is secured to flanges 23 and 24. This plate is flared as at 114 so as to register at its forward end with opening 17. Thus it will be seen that opening 17 is quite large relative to the trough and that a large free flow for the material is provided so as to insure passage of any material the auger is capable of moving toward the auger outlet. No bearing is furnished for the inner end of tube or shaft 104, the augers are confined therefore to the curved portion of the trough and by members 112 and 113. Therefore there is no obstruction at the end of the auger to the free flow of the material from the trough.

Clearly minor detail changes may be made in the design shown without departing from the spirit and scope of my invention as recited in the appended claims.

Having thus shown and described my invention, I claim:

1. A blower elevator of the character described comprising in combination, a housing having a rotor with centrifugally acting blades, an inlet opening in a side panel of said housing and positioned near the bottom thereof and adjacent the vertical plane of the axis of said rotor and on the side opposite to the direction of travel of the blades, a feed trough having therein an auger conveyor, its outlet end being flared downwardly and in direction of travel of the rotor, the end of said flared portion and said trough registering with said inlet, said rotor and auger conveyor adapted to turn in the same direction, whereby the material will be caused to travel from the trough downwardly and in the direction of travel of said blades assisted by gravity into the housing in the path of said blades and while traveling in the same direction as the blades.

2. A device as recited in claim 1 including, a relatively short cover on said trough and positioned to cover a portion of the end of said auger and the upper portion of said inlet, providing means to prevent the material from traveling over the top of the auger and prevent the auger from raising out of bounds and act as a shield for said inlet and delivery end of said auger.

CHARLES V. EVERETT.

REFERENCES CITED

The following references are of record in the file of this patent:

UNITED STATES PATENTS

| Number | Name | Date |
| --- | --- | --- |
| 1,611,291 | Steege | Dec. 21, 1926 |
| 2,180,838 | Saiberlich | Nov. 21, 1939 |
| 2,324,042 | Swensen | July 1, 1943 |
| 2,373,169 | Coultas et al. | Apr. 10, 1945 |
| 2,410,943 | Huddle | Nov. 12, 1946 |
| 2,498,143 | Struckmann | Feb. 21, 1950 |